United States Patent [19]

Burrows

[11] 4,334,866
[45] Jun. 15, 1982

[54] RADAR SIGNAL SIMULATOR

[75] Inventor: Michael J. Burrows, Braintree, England

[73] Assignee: The Marconi Company Limited, Chelmsford, England

[21] Appl. No.: 120,516

[22] Filed: Feb. 11, 1980

[30] Foreign Application Priority Data

Feb. 14, 1979 [GB] United Kingdom ............... 7905258

[51] Int. Cl.³ .................... G01S 13/00; G01S 7/40
[52] U.S. Cl. ................................ 434/2; 343/17.7
[58] Field of Search ................. 434/2, 3; 343/17.7

[56] References Cited

U.S. PATENT DOCUMENTS

| | | | |
|---|---|---|---|
| 2,841,884 | 7/1958 | Birmingham | 434/2 |
| 3,258,770 | 6/1966 | Rapsilber | 434/2 X |
| 3,571,479 | 3/1971 | Horattas | 434/2 |
| 3,718,988 | 3/1973 | Ball et al. | 434/2 |

*Primary Examiner*—Malcolm F. Hubler
*Attorney, Agent, or Firm*—Spencer & Kaye

[57] ABSTRACT

An apparatus which simulates signals received by a radar antenna and which is used for teating radar equipment and for training purposes, Two stores are provided to hold the horizontal and vertical polar diagram characteristics of an antenna, respectively. The appropriate values are read out of these stores by signals representing the azimuth and elevation angles of an imaginary target and the antenna, which may be real or imaginary. The outputs from the stores are combined to give a realistic simulated signal. Since the polar diagram characteristics of an antenna may be different for transmission and reception, each store may be provided in duplicate and the outputs from all four stores combined to produce the simulated signal.

17 Claims, 1 Drawing Figure

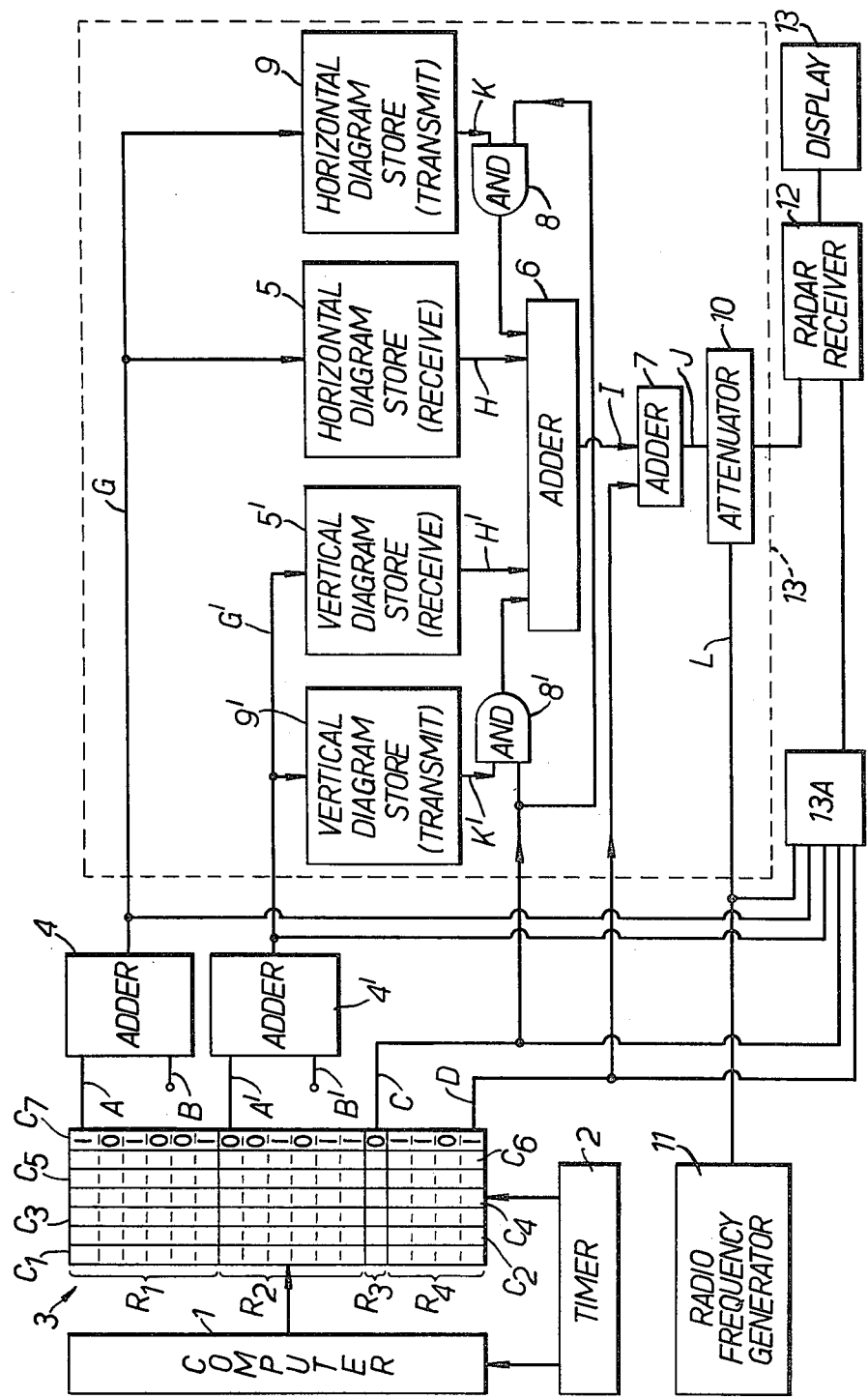

RADAR SIGNAL SIMULATOR

BACKGROUND OF THE INVENTION

This invention relates to a radar signal simulator and is applicable to the simulation of radar signals from imaginary objects which may be stationary or moving. These imaginary objects may be emitters or reflectors of radiation. Radar signal simulators are needed for testing radar equipment and for training purposes. Heretofore, simulated radar signals have not looked very realistic when displayed on the radar screen.

Efforts have been made in the past to attenuate the amplitude of simulated radar signals so as to reproduce the effects which in a real signal would arise from a horizontal polar diagram of an antenna. One such system is described in U.S. Pat. No. 3,108,274 which describes apparatus in which a circular plate intersects a waveguide carrying a microwave signal. The plate has a crescent-shaped aperture which allows a varying amplitude of signal to pass along the waveguide thereby simulating signals received by a radar antenna when scanning a target.

In another system, described in U.S. Pat. No. 3,792,475 an attempt is made to reproduce the varying intensity of radiation received when the latter is being scanned by a search radar. Neither of these systems deals with the problems of simulating signals received by a three dimensional radar, simulating signals received from moving targets or distinguishing between signals received from sources of radiation, eg jammers, and signals which are echoes from non-emitting targets.

SUMMARY OF THE INVENTION

An object of this invention is to deal with the aforementioned problems. The invention provides a radar signal simulator comprising means for producing first and second signals defining the values of respective first and second angular co-ordinates, these co-ordinates together defining the direction of an imaginary object relative to a real or imaginary antenna system; a first store for storing different antenna gain-related values for different values of the first co-ordinate, the first signal being effective to read from the first store a first antenna gain-related value associated with the value of the first co-ordinate; a second store for storing different antenna gain-related values for different values of the second co-ordinate, the second signal being effective to read from the second store a second antenna gain-related value associated with the value of the second co-ordinate; and output circuitry adapted to receive the first and second antenna gain-related values and to give an output signal which represents a combined effect of these.

The first co-ordinate is preferably azimuth angle and the second co-ordinate elevation angle.

The values held in the two stores are preferably logarithmic functions of gain which means that they can then be added in the output circuitry to give a logarithmic function of the product of the two gains. This product is a realistic representation of the actual gain at any selection of azimuth and elevation angles.

It will normally be necessary to make the simulated signal variable according to factors other than its direction relative to the boresight of the antenna. Such other factors are the range of the imaginary object, its size and its surface characteristics. Means are therefore preferably provided for producing a further signal which is fed to the aforementioned output circuitry to introduce the effects of range etc.

The output from the output circuitry is preferably connected to means for modulating a simulated r.f. signal applied to the input of a radar receiver. Alternatively, when the simulator is required only for training purposes, the output can be connected to the input of a display device.

When the simulator is connected to a real radar system the said first and second signals are preferably generated from signals representing the azimuth and elevation of the real system and from other signals representing the azimuth and elevation of an imaginary object.

When it is desired to simulate a situation where radar signals are transmitted by a radar system and returned after reflection from an object, it is necessary to take into consideration the directional characteristics of the antenna system during transmission and reflection. In order to allow for this it is possible to include two additional stores for storing gain-related values appropriate for transmission. These may be slightly different to the values appropriate for reception. The outputs of these additional stores can be fed to the same output circuitry as has previously been mentioned. Since the antenna patterns are often very similar for transmission and reception it would, as an alternative to this technique, be possible to provide means for doubling the outputs from the stores when it is required to simulate the effects both of transmission and reception.

Further features of the invention will appear from the following description and accompanying schematic drawing.

BRIEF DESCRIPTION OF THE DRAWING

The sole drawing FIGURE is a schematic diagram of a radar signal simulator in accordance with the invention.

DESCRIPTION OF THE PREFERRED EMBODIMENTS

Referring to the drawing, it should first be explained that the signals A, A', B, B', C and D are as follows:

A is a signal which is the inverted form of a binary digital signal representing the azimuth of an imaginary object.

B is a digital signal, which at any one time, represents the current azimuth of the boresight of an antenna. In this particular embodiment there is a real antenna but, in alternative systems, means could be provided for simulating this signal B.

A' is a signal which is the inverted form of a binary digital signal representing the elevation of the imaginary object.

B' is a signal which, at any one time, represents the current elevation of the boresight of the antenna (or in an alternative embodiment the imaginary antenna).

C is a binary signal of value 0 when objects which are emitters of radiation are being simulated; and of value 1 when objects which are reflectors are being simulated.

D is a simulated binary digital signal representing the logarithm of the gain, relative to a defined reference such as the system noise level, of the intensity of radiation received from the imaginary target or emitter. The value of this signal D depends on various factors. In the case of a simulated target, which is not an emitter, one of these factors will be the size and nature and attitude of the target. Another will be the fourth power of the distance between the target and the antenna system. In the case of a simulated emitter one of the factors will be the strength of the emitter, and another will be the square of the distance between the target and the antenna system. Inputs B and B', in this particular embodiment of the invention, are derived from the antenna. In other embodiments they could be simulated signals generated by the aforementioned computer.

Inputs A, B, A' & B' are produced as follows. A computer 1 has a cartridge system (not shown) storing data relating to the nature and movement of numerous objects to be simulated. At each one of regularly spaced intervals, defined by a timer 2 the computer outputs digital signals defining the azimuth, elevation and other characteristics of each object to be simulated at that time. This data is entered in a range ordered store 3 from which it is read in a range ordered sequence by further timing signals from the timer, data concerning objects at close range being read from the store 3 before data concerning objects at long range. Thus, for each simulated pulse of the radar system, the signals A, A', C and D appear for all the different imaginary objects in a timed sequence similar to that in which echo signals from real objects at different ranges would be received. When the whole content of the store 3 has been read out, further data appropriate to a new interval of time is entered into the store 3 from the computer 1.

In the drawing various addresses within the store 3 are shown arranged in rows $R_1 R_2 R_3 R_4$ and columns $C_1 C_2 C_3 C_4 C_5 C_6 C_7$. Each column is associated with a particular range window and contains data concerning an object to be simulated within that range window. Columns to the right hand side of the drawing represent relatively close ranges and information in these columns is read out first onto lines A, A', C and D. In reality there would be many more range windows than the six shown schematically in the drawing the number of range windows being related to the range discrimination of the radar with which the system is to be used. For the purposes of example the closest range window is illustrated as containing data defining a non-emitting target at an azimuth angle 101001 and an elevation of 001011. The value 1101 represents an intensity value for the target.

Inputs A and B are summed in an adder 4 to give a signal G which represents the value of a first co-ordinate. This co-ordinate is the difference between the azimuth angles of the antenna system and the target or emitter (i.e. it is the azimuth angle of the target or emitter relative to the boresight of the aerial).

The signal G is fed to a store 5 (which may be ROM, PROM, EPROM or RAM). The store, in this particular embodiment of the invention, is capable of storing 2,048 words each having seven digits. The address of each word is associated with a particular azimuth angle relative to the boresight of the antenna. It is desirable to cover 360 degrees in the azimuth plane so the resolution is 360/2048 which is 0.17578125 degrees. The word at each address is proportional to the logarithm of the gain of the antenna at the appropriate azimuth angle.

The output H from the store 5, which represents attenuation due to the horizontal polar diagram of the aerial system, is fed to an adder 6.

Signals A' and B' are treated in a similar way to signals A and B. They are summed at 4' to produce signal G' which represents the difference in elevation between the object and the boresight of the antenna. The signal G' addresses a store 5' which contains information representing the antenna pattern in a vertical plane. The store 5' is similar to store 5 but does not require so many addresses because the former is required only to cover an angle of 90 degrees between the horizontal and vertical.

Each word in the store 5' represents a value proportional to the logarithm of the antenna gain at the appropriate elevation angle. The word in the store 5' addressed by the signal G' is fed to an output where it appears in the form of a signal H'. The signal H' is fed to the adder 6.

The signals H and H' are summed in the adder 6 to give a signal I which is proportional to log (H,H'). The output I is thus an accurate representation, on a logarithmic scale, of the gain caused by the directional characteristics of the aerial system in azimuth and elevation.

The output I is summed, in a further adder 7, with signal D to give a final output representing the total output gain on a logarithmic scale.

When the signals A, A', represents an object which is a target (rather than an emitter) the binary value at C is 1. This opens gates 8 and 8' which allows stores 9 and 9' to feed their outputs K and K' to the adder 6. These outputs K and K' represent the logarithm of gain values associated with the horizontal and vertical antenna patterns during transmission. The contents of the stores 9 and 9' may be very similar to the contents of the stores 5 and 5' respectively since antenna patterns for transmission are sometimes very similar to those for reception. There may however be differences and of course, if different aerials are used for transmission and reception, there will be a substantial difference.

The output J of the adder 7 is fed to an attenuator 10 where it controls the strength of a radio frequency signal L especially generated by a circuit 11 for the purposes of target simulation. After attenuation the radio frequency signal is fed to the input of a radar receiver 12 and is therefore treated as if it had been received by the antenna.

The radar receiver 12 is a so called three dimensional radar i.e. a radar which is designed to indicate the height or elevation of objects in its field of view as well as their azimuth and range. The elevation is calculated by causing the radar to operate in two or more different modes, the antenna systems having different vertical pola diagrams for different modes of operation. The receiver 12 has two inputs for the respective modes of operation, and these are compared in the receiver to give an indication of the elevation of an object on the display 13. The sum of the inputs is used to indicate the azimuth and range. In order to simulate the different inputs to the receiver 12 the port 13 of the simulator is provided in duplicate as indicated at 13A. In an alternative system it would be possible for the circuits 13 and 13A to share common horizontal polar diagram stores 5 and 9 since these may be substantially constant for the aforementioned different modes of operation. It will be appreciated that for clarity of description only two inputs to the receiver 12 are shown on the drawing. In a practical system numerous inputs would be provided, each having its own circuit like that shown at 13.

I claim:

1. A radar signal simulator comprising means for producing first and second signals defining the values of respective first and second angular co-ordinates together defining the direction of an imaginary object relative to a real or imaginary antenna system; a first store for storing different antenna gain-related values for different values of the first co-ordinate, the first signal being effective to read from the first store a first antenna gain-related value associated with the value of the first co-ordinate; a second store for storing different antenna gain-related values for different values of the second co-ordinate, the second signal being effective to read from the second store a second antenna gain-related value associated with the value of the second co-ordinate; and output circuitry adapted to receive the first and second antenna gain-related values and to give an output signal which represents a combined effect of these.

2. A simulator according to claim 1 in which the output circuitry is designed to add the first value to the second value.

3. A simulator according to claim 1 or 2 including means for producing a further signal, the said circuitry being connected to receive the first and second values and said further signal and to give an output which represents a combined effect of these.

4. A simulator according to claim 1 or 2 in which the output of the said output circuitry is connected to modulate an r.f. signal applied to the input of a radar receiver.

5. A simulator according to claim 1 or 2 including means for producing two signals which are respective functions of the azimuth of the target and the antenna system and means for generating, from these, said first signal.

6. A simulator according to claim 1 or 2 including means for producing two signals which are respective functions of the elevations of the target and the antenna system and means for generating from these, the said second signal.

7. A simulator according to claim 1 or 2 comprising two stores, each for storing different antenna gain-related values for different values of the first co-ordinate, the first signal being effective to read, from the first stores, respective first gain-related values, each associated with the value of the first co-ordinate; two second stores, each for storing different antenna gain-related values for different values of the second co-ordinate, the second signal being effective to read, from the second stores, respective second gain-related values, each associated with the value of the second co-ordinate; the simulator also including switch means controlling whether the output circuitry receives one of the first and one of the second values or both of the first and both of the second values.

8. A simulator according to claim 3 in which the output of the said output circuitry is connected to modulate an r.f. signal applied to the input of a radar receiver.

9. A simulator according to claim 3 including means for producing two signals which are respective functions of the azimuth of the target and the antenna system and means for generating, from these, said first signal.

10. A simulator according to claim 4 including means for producing two signals which are respective functions of the azimuth of the target and the antenna system and means for generating, from these, said first signal.

11. A simulator according to claim 3 including means for producing two signals which are respective functions of the elevations of the target and the antenna system and means for generating from these the said second signal.

12. A simulator according to claim 4 including means for producing two signals which are respective functions of the elevations of the target and the antenna system and means for generating from these the said second signal.

13. A simulator according to claim 5 including means for producing two signals which are respective functions of the elevations of the target and the antenna system and means for generating from these the said second signal.

14. A simulator according to claim 3 comprising two stores, each for storing different antenna gain-related values for different values of the first co-ordinate, the first signal being effective to read, from the first stores, respective first gain-related values, each associated with the value of the first co-ordinate; two second stores, each for storing different antenna gain-related values for different values of the second co-ordinate, the second signal being effective to read, from the second stores, respective second gain-related values, each associated with the value of the second co-ordinate; the simulator also including switch means controlling whether the output circuitry receives one of the first and one of the second values or both of the first and both of the second values.

15. A simulator according to claim 4 comprising two stores, each for storing different antenna gain-related values for different values of the first co-ordinate, the first signal being effective to read, from the first stores, respective first gain-related values, each associated with the value of the first co-ordinate; two second stores, each for storing different antenna gain-related values for different values of the second co-ordinate, the second signal being effective to read, from the second stores, respective second gain-related values, each associated with the value of the second co-ordinate; the simulator also including switch means controlling whether the output circuitry receives one of the first and one of the second values or both of the first and both of the second values.

16. A simulator according to claim 5 comprising two stores, each for storing different antenna gain-related values for different values of the first co-ordinate, the first signal being effective to read, from the first stores, respective first gain-related values, each associated with the value of the first co-ordinate; two second stores, each for storing different antenna gain-related values for different values of the second co-ordinate, the second signal being effective to read, from the second stores, respective second gain-related values, each associated with the value of the second co-ordinate; the simulator also including switch means controlling whether the output circuitry receives one of the first and one of the second values or both of the first and both of the second values.

17. A simulator according to claim 6 comprising two stores, each for storing different antenna gain-related values for different values of the first co-ordinate, the first signal being effective to read, from the first stores, respective first gain-related values, each associated with the value of the first co-ordinate; two second stores, each for storing different antenna gain-related values for different values of the second co-ordinate, the second signal being effective to read, from the second stores, respective second gain-related values, each associated with the value of the second co-ordinate; the simulator also including switch means controlling whether the output circuitry receives one of the first and one of the second values or both of the first and both of the second values.

* * * * *